United States Patent
Ziegler et al.

(10) Patent No.: US 12,516,004 B2
(45) Date of Patent: Jan. 6, 2026

(54) PROCESSES AND APPARATUSES FOR SEPARATING AROMATIC AND NON-AROMATIC HYDROCARBONS

(71) Applicant: UOP LLC, Des Plaines, IL (US)

(72) Inventors: Daniel Ziegler, Chicago, IL (US); Gregory R. Werba, Arlington Heights, IL (US); Cealashea Baggett, Chicago, IL (US); Joe R. Haas, Glenview, IL (US); Rajesh Rajappan, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 167 days.

(21) Appl. No.: 18/459,618

(22) Filed: Sep. 1, 2023

(65) Prior Publication Data

US 2024/0109824 A1     Apr. 4, 2024

Related U.S. Application Data

(60) Provisional application No. 63/377,807, filed on Sep. 30, 2022.

(51) Int. Cl.
| | |
|---|---|
| *C07C 7/08* | (2006.01) |
| *B01D 3/00* | (2006.01) |
| *B01D 3/14* | (2006.01) |
| *B01D 3/40* | (2006.01) |
| *C07C 7/04* | (2006.01) |

(52) U.S. Cl.
CPC ............. *C07C 7/08* (2013.01); *B01D 3/007* (2013.01); *B01D 3/143* (2013.01); *B01D 3/40* (2013.01)

(58) Field of Classification Search
None
See application file for complete search history.

(56) References Cited

U.S. PATENT DOCUMENTS

| | | |
|---|---|---|
| 3,477,915 A | 11/1969 | Gantt et al. |
| 3,881,994 A | 5/1975 | Fickel |
| 4,410,400 A * | 10/1983 | Preusser .................. C07C 7/08 585/800 |

(Continued)

FOREIGN PATENT DOCUMENTS

| | | |
|---|---|---|
| CN | 1923772 A | 3/2007 |
| WO | 2016137766 A1 | 9/2016 |
| WO | 2020212315 A1 | 10/2020 |

OTHER PUBLICATIONS

International Search Report from corresponding PCT application No. PCT/US2023/075016, dated Jan. 16, 2024.

(Continued)

*Primary Examiner* — Tam M Nguyen

(57) ABSTRACT

Processes and apparatuses for separating aromatic and non-aromatic hydrocarbons by extractive distillation. A solvent is mixed with the aromatic and non-aromatic hydrocarbons. A first separation column separates non-aromatic hydrocarbons from the solvent and the aromatic hydrocarbons. A second separation column separates the aromatic hydrocarbons and the solvent. A side draw stream from the second separation column is used to heat the feed stream to the first separation column. A bottom stream from the second separation may be used to heat the liquid in the first separation column. A stab-in reboiler may be used to transfer heat from the bottoms stream to the liquid in the first separation column.

16 Claims, 3 Drawing Sheets

(56) References Cited

U.S. PATENT DOCUMENTS

| | | | | |
|---|---|---|---|---|
| 5,176,821 A | * | 1/1993 | Forte | B01D 3/38 |
| | | | | 208/321 |
| 5,180,474 A | | 1/1993 | Skatulla et al. | |
| 5,225,072 A | * | 7/1993 | Vidueira | C07C 7/08 |
| | | | | 208/324 |
| 5,252,200 A | | 10/1993 | Skatulla et al. | |
| 5,336,840 A | | 8/1994 | Forte | |
| 5,399,244 A | * | 3/1995 | Gentry | C07C 7/08 |
| | | | | 203/64 |
| 5,849,982 A | * | 12/1998 | Lee | C07C 15/46 |
| | | | | 585/866 |
| 6,007,707 A | | 12/1999 | Donnermeyer et al. | |
| 6,303,021 B2 | * | 10/2001 | Winter | C10G 21/00 |
| | | | | 208/321 |
| 9,221,729 B1 | * | 12/2015 | Lee | C10G 21/28 |
| 2009/0223862 A1 | * | 9/2009 | MacDonald | C10M 175/005 |
| | | | | 208/184 |
| 2009/0324457 A1 | * | 12/2009 | Bresler | C07C 7/08 |
| | | | | 422/187 |
| 2012/0285196 A1 | | 11/2012 | Flinn et al. | |
| 2012/0330076 A1 | | 12/2012 | Smith et al. | |
| 2022/0306950 A1 | * | 9/2022 | Hwang | C07C 7/005 |

OTHER PUBLICATIONS

Written Opinion from corresponding PCT application No. PCT/US2023/075016, dated Jan. 16, 2024.

Salvador Tututi-Avila et al., Design of an Energy-Efficient Side-Stream Extractive Distillation System, Computers & Chemical Engineering, Dec. 2016. DOI: 10.1016/j.compchemeng.2016.12.001.

* cited by examiner

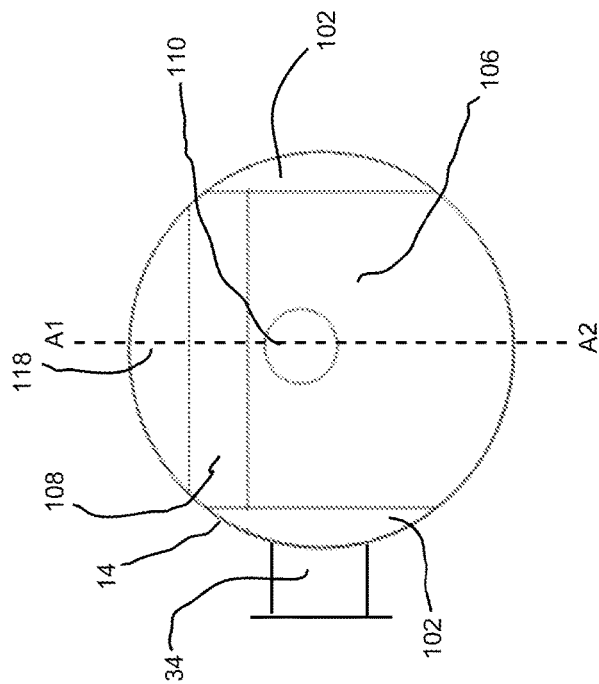
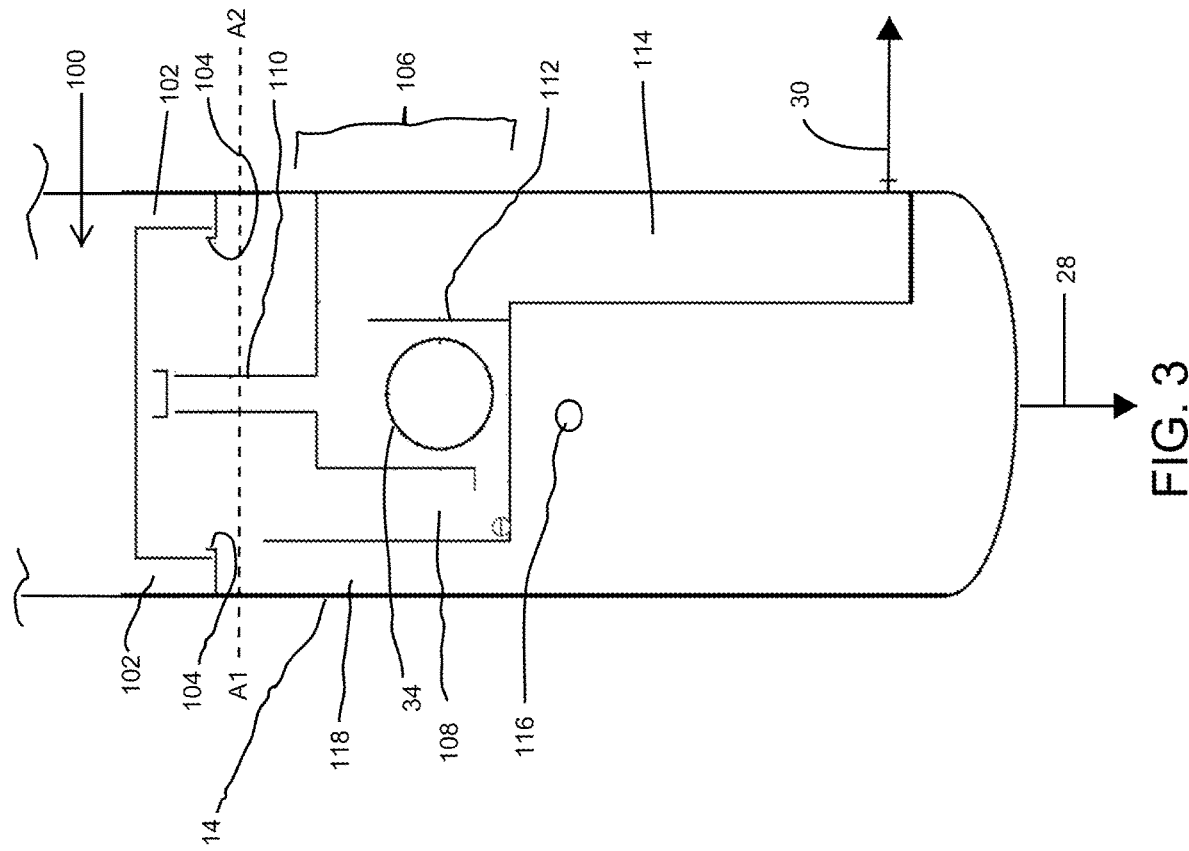
FIG. 4
FIG. 3

PROCESSES AND APPARATUSES FOR SEPARATING AROMATIC AND NON-AROMATIC HYDROCARBONS

RELATED APPLICATIONS

This application claims priority to U.S. Provisional Patent Application Ser. No. 63/377,807 filed on Sep. 30, 2022, the entirety of which is incorporated herein by reference.

FIELD OF THE INVENTION

This invention relates generally to processes and apparatuses for separating aromatic and non-aromatic hydrocarbons, and more particularly to processes and apparatuses for transferring heat to effectively and efficiently separate the aromatic and non-aromatic hydrocarbons.

BACKGROUND OF THE INVENTION

Extractive distillation is a separation method used in chemical processing, especially for the recovery of aromatics from a mixed stream of aromatic and non-aromatic hydrocarbons. A key aspect of extractive distillation is that a separating agent, a solvent with a high boiling point, is added to a component mixture for separation which increases relative volatility when the components of the mixed stream have similar or close boiling points. Typically, two columns are utilized in extractive distillation—an extractive-distillation column and a solvent recovery column.

The extractive distillation column separates aromatic from non-aromatic components while the solvent recovery column separates aromatics from the solvent. The final extracted aromatic stream is drawn from the overhead of the solvent recovery column.

While the extractive distillation is effective for its intended purposes, there is an ongoing desire to reduce utility demands and provide more efficient separation processes.

SUMMARY OF THE INVENTION

The present invention provides for extractive distillation with reduced utility consumption compared with existing solutions.

According to the present invention, a side draw from the recovery column to return solvent to the extractive distillation column is utilized which decreases the duty requirement at the recovery column reboiler. In existing solutions, the extractive distillation column uses a reboiler with an external process-process heat exchanger followed by a utility exchanger. The extractive distillation column reboiler preheater duty is limited by percent vaporization to the utility reboiler due to concerns over maldistribution. In a side draw flow scheme, the reboiler preheater mean temperature difference (MTD) is reduced due to the lower hot side solvent flow rates. An internal heat exchanger, such as a stab-in reboiler preheater, further reduces utility consumption and may also reduce concerns over vaporization and improve the exchanger MTD.

Therefore, in at least one aspect, the present invention may be generally characterized as providing a process for separating aromatic and nonaromatic hydrocarbons by: separating, in a first separation zone, a feed stream comprising aromatic and nonaromatic hydrocarbons into a first stream comprising the nonaromatic hydrocarbons and a second stream comprising the aromatic hydrocarbons and a solvent; separating, in a second separation zone, the second stream into a third stream comprising the aromatic hydrocarbons, a fourth stream comprising the solvent, and a fifth stream comprising the solvent, wherein the fourth stream comprises a side draw stream; transferring heat, in a first heat transfer zone, from the fifth stream to the first separation zone; and, transferring heat, in a second heat transfer zone, from the fourth stream to the feed stream, wherein the fourth stream is passed to the first separation zone from the second heat transfer zone, and wherein the fifth stream is passed to the first separation zone after transferring heat to the first separation zone.

The present invention may also be broadly characterized in at least one aspect as providing a process for separating aromatic and nonaromatic hydrocarbons by: passing a feed stream comprising aromatic and nonaromatic hydrocarbons to a first separation zone comprising a separation column configured to provide a first stream comprising the nonaromatic hydrocarbons and a second stream comprising the aromatic hydrocarbons and a solvent; passing the second stream to a second separation zone comprising a separation column configured to provide a third stream comprising the aromatic hydrocarbons, a fourth stream comprising the solvent, and a fifth stream comprising the solvent, wherein the fourth stream comprises a side draw stream; passing the fifth stream to a first heat transfer zone configured to transfer heat from the fifth stream to the first separation zone, wherein the first heat transfer zone is inside of the separation column in the first separation zone; passing the fourth stream to a second heat transfer zone configured to transfer heat from the fourth stream to the feed stream; and, after passing the fourth stream to the second heat transfer zone, passing the fourth stream to the separation column in the first separation zone.

In one or more aspects, the present invention may further be characterized generally as providing an apparatus for separating aromatic and nonaromatic hydrocarbons having: a first separation zone comprising a separation column configured to receive a feed stream comprising aromatic and nonaromatic hydrocarbons and provide a first stream comprising the nonaromatic hydrocarbons and a second stream comprising the aromatic hydrocarbons and a solvent; a second separation zone comprising a separation column configured to receive the second stream and provide a third stream comprising the aromatic hydrocarbons, a fourth stream comprising the solvent, and a fifth stream comprising the solvent, wherein the fourth stream comprises a side draw stream; a first heat transfer zone configured to transfer heat from the fifth stream to the first separation zone, wherein the first heat transfer zone is disposed within the separation column in the first separation zone; a second heat transfer zone configured to transfer heat from the fourth stream to the feed stream; a third heat transfer zone configured to transfer heat from the fifth stream to the feed stream; a line configured to pass the fifth stream from the third heat transfer zone to the separation column in the first separation zone; and, a line configured to pass the fourth stream from the second heat transfer zone to the separation column in the first separation zone.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which:

FIG. 3 shows a side partially cutaway view of a portion of an extractive distillation column according to one or more aspects of the present invention; and, FIG. 4 shows a top cutaway view taken along line A1-A2 in FIG. 3.

DETAILED DESCRIPTION OF THE INVENTION

Figure 1:
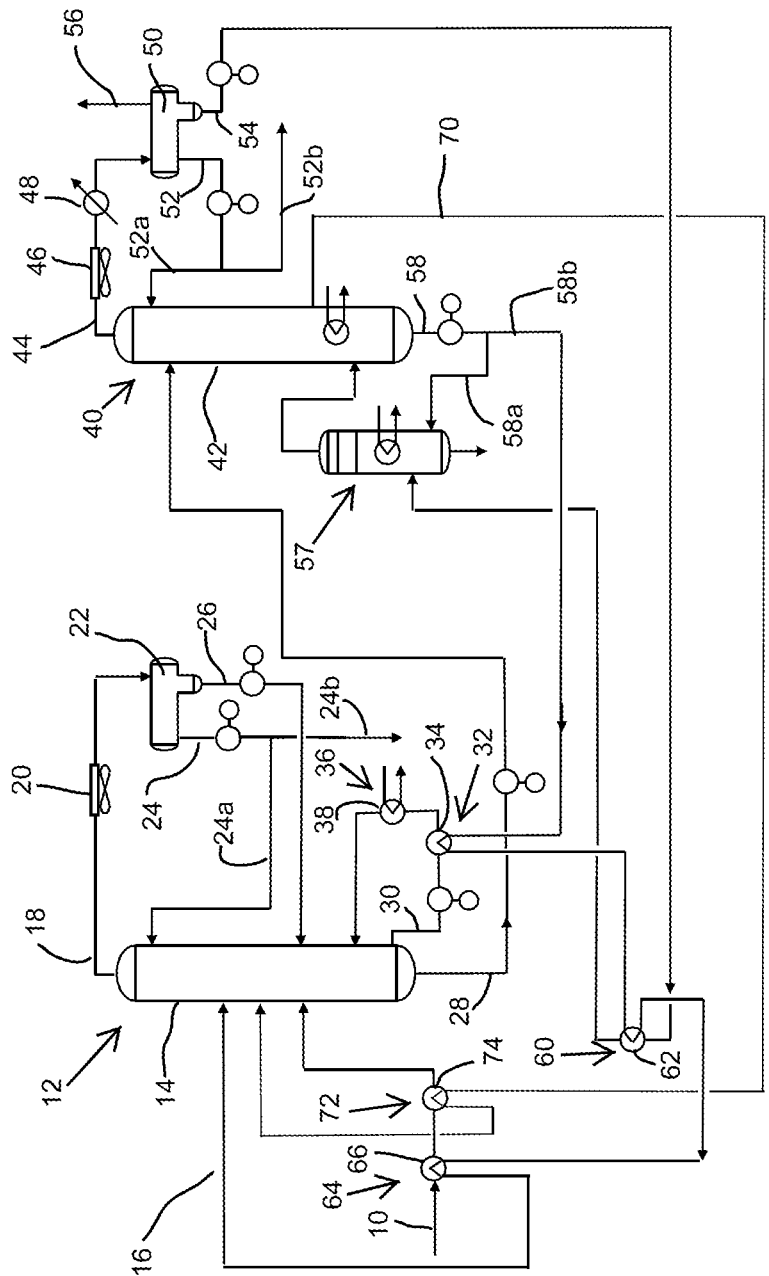
FIG. 1 is a process flow diagram of an aspect of the present invention.

As used herein, the term "stream" can include various hydrocarbon molecules and other substances.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

As used herein, the term "overhead stream" can mean a stream withdrawn at or near a top of a vessel, such as a column.

As used herein, the term "bottoms stream" can mean a stream withdrawn at or near a bottom of a vessel, such as a column.

Hydrocarbon molecules may be abbreviated C1, C2, C3, Cn where "n" represents the number of carbon atoms in the one or more hydrocarbon molecules or the abbreviation may be used as an adjective for, e.g., non-aromatics or compounds. Similarly, aromatic compounds may be abbreviated A6, A7, A8, An where "n" represents the number of carbon atoms in the one or more aromatic molecules. Furthermore, a superscript "+" or "−" may be used with an abbreviated one or more hydrocarbons notation, e.g., C3+ or C3−, which is inclusive of the abbreviated one or more hydrocarbons. As an example, the abbreviation "C3+" means one or more hydrocarbon molecules of three or more carbon atoms.

As used herein, the term "zone" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top or overhead pressure is the pressure of the overhead vapor at the vapor outlet of the column. The bottom temperature is the liquid bottom outlet temperature. Net overhead lines and net bottoms lines refer to the net lines from the column downstream of any reflux or reboil to the column unless otherwise shown. Stripping columns may omit a reboiler at a bottom of the column and instead provide heating requirements and separation impetus from a fluidized inert media such as steam.

As depicted, process flow lines in the drawings can be referred to interchangeably as, e.g., lines, pipes, feeds, gases, products, discharges, parts, portions, or streams.

The term "passing" means that the material passes from a conduit or vessel to an object.

As mentioned above, the present invention relates to extractive distillation which includes a solvent side draw from the recovery column with a solvent side draw feed heater, and a stab-in extractive distillation column reboiler preheater. The addition of a solvent side draw from the recovery column allows for heating savings because the full solvent stream no longer must be heated to the column bottoms temperature. Studies have shown that recycling 30%-40% of the total solvent flow through the side draw yields a 5% energy benefit over conventional designs.

The addition of a solvent side draw feed exchanger is aspect of the present invention. This exchanger cools the solvent side draw while simultaneously heating the hydrocarbon feed to the unit. Including this exchanger redistributes heat within the Extractive Distillation column and, based on the location of the heat flows, the total solvent to feed ratio can be reduced by approximately 13% over prior designs such as the one depicted in U.S. Pat. No. 5,180,474. In addition to energy benefits, these differences allow for smaller equipment through lower solvent to feed ratios which is a surprising and an unexpected outcome.

Further energy benefit can be achieved by implementing a stab-in extractive distillation reboiler preheater in conjunction with a solvent side draw. With the inclusion of a solvent side draw there is less solvent mass flow from the bottom of the recovery column. The recovery column bottoms material is used to heat the extractive distillation column reboiler preheater and with lower bottoms flow there is less heat in the stream to deliver to the extractive distillation column. To alleviate the concerns over low MTD a stab-in reboiler preheater can be utilized. A stab-in preheater operates at the column bottoms pressure which implies a lower outlet temperature than for an external reboiler operating at a higher pressure. Separating the extractive distillation column reboiler preheater from the extractive distillation column pumped reboiler loop additionally removes concerns over maldistribution in the primary reboiler due to vapor at the tube side inlet. Implementing a vertical reboiler allows for the removal of a large reboiler pump from the existing process flow scheme which can reduce the cost and allow for an additional 5%-6% energy benefit over the side draw flow scheme alone.

With the stab-in reboiler, cooler liquid from the trayed section is contacted with the reboiler preheater as the maximum hot side temperature is set by the recovery column bottoms. Vaporized material from the reboiler preheater is able to rise up the column while liquid continues to an external reboiler. This configuration effectively creates two stage reboiler as the vapor from each reboiler is in fact a different temperature. The reboiler preheater and primary reboiler operate in series as opposed to the more common parallel configuration.

With these general principles in mind, one or more embodiments of the present invention will be described with the understanding that the following description is not intended to be limiting.

Figure 2:
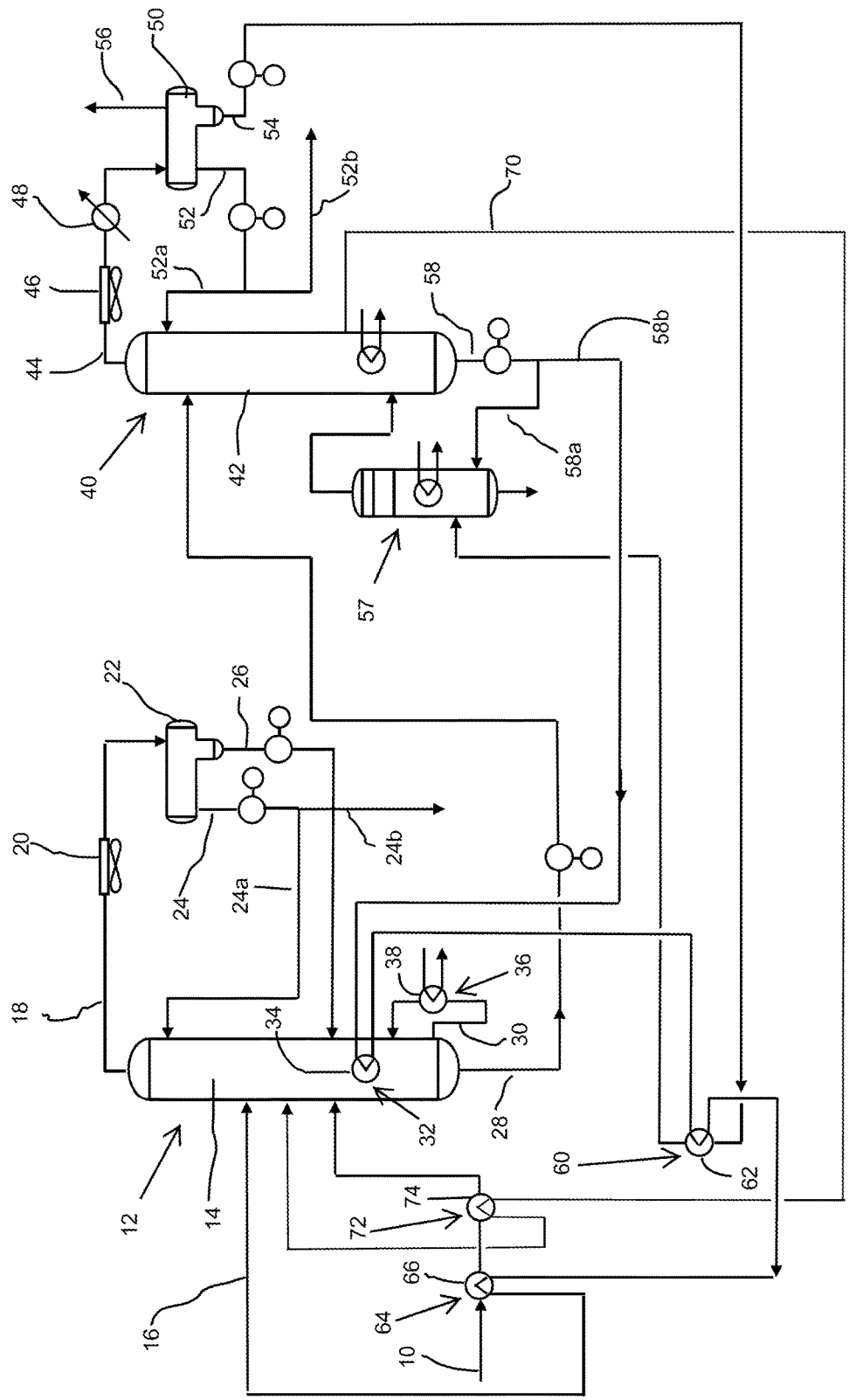
FIG. 2 is a process flow diagram of another aspect of the present invention.

As shown in FIGS. 1 and 2, a hydrocarbon feed stream 10 containing a mixture of aromatic and non-aromatic hydrocarbons is to first separation zone 12. The first separation zone comprises an extractive-distillation column 14. A first solvent stream 16 is also passed to the extractive-distillation column 14, preferably at a position above the hydrocarbon feed stream 10.

As is known, in the extractive-distillation column 14, the solvent mixes with the hydrocarbon in the feeds and affects the volatility of the hydrocarbon feed to facilitate the separation of the various hydrocarbon-containing fluid components by distillation and such solvent exits with a bottoms fraction. An example solvent is tetrahydrothiophene 1,1-dioxide (or sulfolane).

Accordingly, a non-aromatics vapor stream 18 exits a top of the extractive-distillation column 14, is condensed via a condenser 20, and transferred to an overhead receiver 22. In the overhead receiver 22, a phase separation between non-aromatic hydrocarbons and a water phase occurs. Accordingly, a non-aromatic hydrocarbon stream 24 and a water stream 26 are recovered from the overhead receiver 22. A first portion 24a of the non-aromatic hydrocarbon stream 24 may be recycled to the extractive-distillation column 14 as reflux. The water stream 26 may also be returned to the extractive distillation column 14. The second portion 24b of the non-aromatic hydrocarbon stream 24 is a non-aromatic hydrocarbon stream and the further processing of the second portion 24b of the non-aromatic hydrocarbon stream 24 is not described as it is known in the art.

A bottoms stream 28 from the extractive-distillation column 14 comprises the solvent and the aromatic hydrocarbons and is passed to a second separation zone 40. Further, a liquid stream 30, comprising a mixture of solvent and aromatic hydrocarbons, is withdrawn from the extractive distillation column 14 and heated in a heat transfer zone 32 having a heat exchanger 34 (discussed in more detail below). In another heat transfer zone 36, a heat exchanger 38, such as a steam reboiler, may also provide additional heat to the liquid stream 30 which is then recycled to the extractive-distillation column 14 to generate vapor in the extractive distillation column 14.

The second separation zone 40 comprises a solvent recovery column 42. As is known, in the solvent recovery column 42, the solvent and the aromatic hydrocarbons are separated by boiling point. Accordingly, an aromatics overhead stream 44 exits a top of the solvent recovery column 42, is condensed via a condenser 46, and cooled in a cooler 48, and transferred to an overhead receiver 50. In the overhead receiver 50, a phase separation between hydrocarbons and a water phase occurs. Accordingly, an aromatic hydrocarbon stream 52 and a water stream 54 are recovered from the overhead receiver 50. The overhead received 50 also includes a line 56 for vapor. A first portion 52a of the aromatic hydrocarbon stream 52 may be recycled to the solvent recovery column 42 as reflux. The water stream 54 may be passed to a solvent regeneration zone 57 which is not described in detail as it is known in the art.

A bottoms stream 58 from the solvent recovery column 42 comprises mostly solvent that can be reused in the first separation zone 12 to separate the aromatic and nonaromatic hydrocarbons of the feed stream 10. A first portion 58a of the bottoms stream 58 from the solvent recovery column 42 may be passed to the solvent regeneration zone 57.

A second portion 58b of the bottoms stream 58 from the solvent recovery column 42 is used to provide heat to the first separation zone 12. Accordingly, the second portion 58b of the bottoms stream 58 from the solvent recovery column 42 is passed to the heat transfer zone 32 to heat the liquid stream 30 from the extractive distillation column 14. This transfers heat to the first separation zone 12 from the bottoms stream 58 from the solvent recovery column 42.

Additionally, the second portion 58b of the bottoms stream 58 from the solvent recovery column 42 may be used to heat, in another heat transfer zone 60, the water stream 54 from the overhead receiver 50. Finally, before being passed to the extractive-distillation column 14 as the solvent stream 16, the second portion 58b of the bottoms stream 58 from the solvent recovery column 42 may be used to heat, in a further heat transfer zone 64, the feed stream 10. As will be appreciated, these heat transfer zones 60, 64 may include a heat exchanger 62, 66 to transfer heat between the streams.

As discussed above, in the various aspects of the present invention, a side draw stream 70, comprising mostly solvent, is also provided by the solvent recovery column 42. The side draw stream 70 is passed to a heat transfer zone 72 to provide heat to the feed stream 10 from the side draw stream 70. This heat transfer zone 72 also includes a heat exchanger 74 to transfer heat between the streams. From this heat transfer zone 72, the side draw stream 70 is passed into the extractive-distillation column 14, preferably between the solvent stream 16 and the feed stream 10.

The side draw stream 70 provides some utility savings and the inclusion of the heat transfer zone 72 which transfers heat from the side draw stream 70 to the feed 10 allows for less overall solvent as compared to a flow scheme that includes a side draw without such a heat transfer zone. the present invention also contemplates additional advantages and benefits when using a stab-in heat exchanger, or reboiler.

Accordingly, as shown in FIG. 2, the heat transfer zone 32 which transfers heat from the second portion 58b of the bottoms stream 58 of the solvent recovery column 42 to the extractive-distillation column 14 may be an internal heat exchanger located within the extractive-distillation column 14. Accordingly, the heat exchanger 34 in this heat transfer zone 32 may be the stab-in heat exchanger. This heat exchanger 34 functions as a preheater for the extractive distillation column 14 bottoms reboiler.

Turning to FIGS. 3 and 4, a preferred configuration of the extractive distillation column 14 having the stab-in heat exchanger 34 will be described.

The extractive distillation column 14 includes a tray section 100 which includes trays and other structures configured to increase the contact between vapors rising in the extractive distillation column 14 and liquid falling in the extractive distillation column 14. One or more downcomers 102 are located at the bottom of the tray section 100. As will be appreciated, the depicted tray section 100 is a 2-pass tray. This is merely illustrative. Other configurations may be utilized including single pass, or 3- or 4-pass trays.

Liquid from the downcomers 102 overflows a weir 104 and collects on a liquid collector section 106 which has a well 108. The liquid from the well 108 will be heated by the stab-in exchanger 34 re-boiling and vaporizing a portion thereof. The vaporized portion can rise upwards in the extractive distillation column 14, towards the tray section 100, through a first riser 110 which extends above the liquid collector section 106. Heated liquid from the well 108, overflows a second weir 112 and is collected in a second well 114.

From the second well 114, the liquid stream 76 is withdrawn and passed to the heat exchange zone 36 (see FIG. 2). The heated stream is returned to the extractive distillation column 14 at an injection point 116. The heated liquids are collected at the bottom of the extractive distillation column 14 and the bottoms stream 28 from the extractive distillation column 14 may be withdrawn therefrom.

Vapors from the material at the bottom of the extractive distillation column 14 (having a higher temperature compared to the vapors from the well 108) rise up the extractive distillation column 14 towards the tray section 100 through a second riser 118. The second riser 118 also extends above the liquid collector section 106 and bypasses the stab-in heat exchanger 34. Thus, the extractive distillation column 14 has a combined space 120 which receives vapor via the first riser 110 and vapor via the second riser 118. This creates a two-stage reboiler with vapor from the preheater (well 108) returning to the tray section 100 of the extractive distillation column 14 through the first riser 110 at a lower temperature than the vapor rising from the primary reboiler and returning to the tray section 100 of the extractive distillation column 14 through the second riser 118.

This use of the stab-in heat exchanger 34 further increases the energy effectiveness and further lowers the utility of the extractive distillation process by allowing for more heat to be recovered from the bottoms stream 58*b* from the solvent recovery column 42.

EXPERIMENTS

An extractive distillation is typically fed from a larger aromatics complex with a stream that is approximately 50%-55% aromatic components. Process simulations have estimated that an extractive distillation that receives a 53% aromatic feed stream, the overall utility consumption can decrease in the range of 5.5%-7.3% dependent upon the overall flow scheme utilized.

Similarly, for an aromatic rich feed of 73% aromatics, process simulations have estimated that utility consumption of the extractive distillation can be reduced by up to 9.2%.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for separating aromatic and nonaromatic hydrocarbons, the process comprising separating, in a first separation zone, a feed stream comprising aromatic and nonaromatic hydrocarbons into a first stream comprising the nonaromatic hydrocarbons and a second stream comprising the aromatic hydrocarbons and a solvent; separating, in a second separation zone, the second stream into a third stream comprising the aromatic hydrocarbons, a fourth stream comprising the solvent, and a fifth stream comprising the solvent, wherein the fourth stream comprises a side draw stream; transferring heat, in a first heat transfer zone, from the fifth stream to the first separation zone; and, transferring heat, in a second heat transfer zone, from the fourth stream to the feed stream, wherein the fourth stream is passed to the first separation zone from the second heat transfer zone, and wherein the fifth stream is passed to the first separation zone after transferring heat to the first separation zone. An embodiment of the invention is one, any or all of prior embodiments in this paragraph up through the first embodiment in this paragraph further comprising transferring heat, in a third heat transfer zone, from the fifth stream to the feed stream. An embodiment of the invention is one, any or all of prior embodiments in this paragraph up through the first embodiment in this paragraph, wherein the first separation zone comprises a separation column. An embodiment of the invention is one, any or all of prior embodiments in this paragraph up through the first embodiment in this paragraph, wherein the first heat transfer zone is inside of the separation column. An embodiment of the invention is one, any or all of prior embodiments in this paragraph up through the first embodiment in this paragraph, wherein transferring heat in the first heat transfer zone, from the fifth stream to the first separation zone comprises, transferring heat to liquid within the column. An embodiment of the invention is one, any or all of prior embodiments in this paragraph up through the first embodiment in this paragraph, wherein the first heat transfer zone comprises a stab-in heat exchanger. An embodiment of the invention is one, any or all of prior embodiments in this paragraph up through the first embodiment in this paragraph, wherein the separation column comprises a liquid collector section with a first riser and a second riser, the first riser and the second riser both extending above the liquid collector section, wherein the first riser bypasses the stab-in heat exchanger. An embodiment of the invention is one, any or all of prior embodiments in this paragraph up through the first embodiment in this paragraph, wherein the first riser and the second riser both transfer vapor to a combined space above the liquid collector section.

A second embodiment of the invention is a process for separating aromatic and nonaromatic hydrocarbons, the process comprising passing a feed stream comprising aromatic and nonaromatic hydrocarbons to a first separation zone comprising a separation column configured to provide a first stream comprising the nonaromatic hydrocarbons and a second stream comprising the aromatic hydrocarbons and a solvent; passing the second stream to a second separation zone comprising a separation column configured to provide a third stream comprising the aromatic hydrocarbons, a fourth stream comprising the solvent, and a fifth stream comprising the solvent, wherein the fourth stream comprises a side draw stream; passing the fifth stream to a first heat transfer zone configured to transfer heat from the fifth stream to the first separation zone, wherein the first heat transfer zone is inside of the separation column in the first separation zone; passing the fourth stream to a second heat transfer zone configured to transfer heat from the fourth stream to the feed stream; and, after passing the fourth stream to the second heat transfer zone, passing the fourth stream to the separation column in the first separation zone. An embodiment of the invention is one, any or all of prior embodiments in this paragraph up through the second embodiment in this paragraph, wherein the first heat transfer zone comprises a stab-in heat exchanger. An embodiment of the invention is one, any or all of prior embodiments in this paragraph up through the second embodiment in this paragraph, wherein the separation column comprises a liquid collector section with a first riser and a second riser, the first riser and the second riser both extending above the liquid collector section, wherein the first riser bypasses the stab-in heat exchanger. An embodiment of the invention is one, any or all of prior embodiments in this paragraph up through the second embodiment in this paragraph, wherein the first riser and the second riser both transfer vapor to a combined space above the liquid collector section. An embodiment of the invention is one, any or all of prior embodiments in this paragraph up through the second embodiment in this paragraph, further comprising before passing the fifth stream to the first separation zone and after passing the fifth stream to the first heat transfer zone, passing the fifth stream to a third heat transfer zone configured to transfer heat from the fifth stream to the feed stream. An embodiment of the invention is one, any or all of prior embodiments in this paragraph up through the second embodiment in this paragraph, wherein the feed stream passes through the third heat transfer zone before the feed stream passes to the second heat transfer zone. An embodiment of the invention is one, any or all of prior embodiments in this paragraph up through the second embodiment in this paragraph, further comprising before passing the fifth stream to the third heat transfer zone and after passing the fifth stream to the first heat transfer zone, passing the fifth stream to a fourth heat transfer zone configured to transfer heat from the fifth stream. An embodiment of the invention is one, any or all of prior embodiments in this paragraph up through the second embodiment in this paragraph further comprising passing a liquid stream from the separation column in the first separation zone to a fifth heat transfer zone configured to heat the liquid stream and provide a reheated liquid stream, and, passing the reheated liquid stream into the separation column in the first separation zone below the first heat transfer zone, wherein the liquid stream comprises solvent and aromatic hydrocarbons.

A third embodiment of the invention is an apparatus for separating aromatic and nonaromatic hydrocarbons, the apparatus comprising a first separation zone comprising a separation column configured to receive a feed stream comprising aromatic and nonaromatic hydrocarbons and provide a first stream comprising the nonaromatic hydrocarbons and a second stream comprising the aromatic hydrocarbons and a solvent; a second separation zone comprising a separation column configured to receive the second stream and provide a third stream comprising the aromatic hydrocarbons, a fourth stream comprising the solvent, and a fifth stream comprising the solvent, wherein the fourth stream comprises a side draw stream; a first heat transfer zone configured to transfer heat from the fifth stream to the first separation zone, wherein the first heat transfer zone is disposed within the separation column in the first separation zone; a second heat transfer zone configured to transfer heat from the fourth stream to the feed stream; a third heat transfer zone configured to transfer heat from the fifth stream to the feed stream; a line configured to pass the fifth stream from the third heat transfer zone to the separation column in the first separation zone; and, a line configured to pass the fourth stream from the second heat transfer zone to the separation column in the first separation zone. An embodiment of the invention is one, any or all of prior embodiments in this paragraph up through the third embodiment in this paragraph, wherein the first heat transfer zone comprises a stab-in heat exchanger. An embodiment of the invention is one, any or all of prior embodiments in this paragraph up through the third embodiment in this paragraph, wherein the separation column in the first separation zone comprises a liquid collector section with a first riser and a second riser, the first riser and the second riser both extending above the liquid collector section, wherein the first riser bypasses the stab-in heat exchanger. An embodiment of the invention is one, any or all of prior embodiments in this paragraph up through the third embodiment in this paragraph, wherein the first riser and the second riser both transfer vapor to a combined space above the liquid collector section.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for separating aromatic and nonaromatic hydrocarbons, the process comprising:
    separating, in a first separation zone, a feed stream comprising aromatic and nonaromatic hydrocarbons into a first stream comprising the nonaromatic hydrocarbons and a second stream comprising the aromatic hydrocarbons and a solvent;

separating, in a second separation zone, the second stream into a third stream comprising the aromatic hydrocarbons, a fourth stream comprising the solvent, and a fifth stream comprising the solvent, wherein the fourth stream comprises a side draw stream;

transferring heat, in a first heat transfer zone, from the fifth stream to the first separation zone; and, transferring heat, in a second heat transfer zone, from the fourth stream to the feed stream, wherein the fourth stream is passed to the first separation zone from the second heat transfer zone, and wherein the fifth stream is passed to the first separation zone after transferring heat to the first separation zone.

2. The process of claim 1 further comprising:

transferring heat, in a third heat transfer zone, from the fifth stream to the feed stream.

3. The process of claim 1, wherein the first separation zone comprises a separation column.

4. The process of claim 3, wherein the first heat transfer zone is inside of the separation column.

5. The process of claim 4, wherein transferring heat in the first heat transfer zone, from the fifth stream to the first separation zone comprises, transferring heat to liquid within the column.

6. The process of claim 5, wherein the first heat transfer zone comprises a stab-in heat exchanger.

7. The process of claim 6, wherein the separation column comprises a liquid collector section with a first riser and a second riser, the first riser and the second riser both extending above the liquid collector section, wherein the first riser bypasses the stab-in heat exchanger.

8. The process of claim 7, wherein the first riser and the second riser both transfer vapor to a combined space above the liquid collector section.

9. A process for separating aromatic and nonaromatic hydrocarbons, the process comprising:

passing a feed stream comprising aromatic and nonaromatic hydrocarbons to a first separation zone comprising a separation column configured to provide a first stream comprising the nonaromatic hydrocarbons and a second stream comprising the aromatic hydrocarbons and a solvent;

passing the second stream to a second separation zone comprising a separation column configured to provide a third stream comprising the aromatic hydrocarbons, a fourth stream comprising the solvent, and a fifth stream comprising the solvent, wherein the fourth stream comprises a side draw stream;

passing the fifth stream to a first heat transfer zone configured to transfer heat from the fifth stream to the first separation zone, wherein the first heat transfer zone is inside of the separation column in the first separation zone;

passing the fourth stream to a second heat transfer zone configured to transfer heat from the fourth stream to the feed stream; and, after passing the fourth stream to the second heat transfer zone, passing the fourth stream to the separation column in the first separation zone.

10. The process of claim 9, wherein the first heat transfer zone comprises a stab-in heat exchanger.

11. The process of claim 10, wherein the separation column comprises a liquid collector section with a first riser and a second riser, the first riser and the second riser both extending above the liquid collector section, wherein the first riser bypasses the stab-in heat exchanger.

12. The process of claim 11, wherein the first riser and the second riser both transfer vapor to a combined space above the liquid collector section.

13. The process of claim 9, further comprising:

before passing the fifth stream to the first separation zone and after passing the fifth stream to the first heat transfer zone, passing the fifth stream to a third heat transfer zone configured to transfer heat from the fifth stream to the feed stream.

14. The process of claim 13, wherein the feed stream passes through the third heat transfer zone before the feed stream passes to the second heat transfer zone.

15. The process of claim 13, further comprising:

before passing the fifth stream to the third heat transfer zone and after passing the fifth stream to the first heat transfer zone, passing the fifth stream to a fourth heat transfer zone configured to transfer heat from the fifth stream.

16. The process of claim 9 further comprising:

passing a liquid stream from the separation column in the first separation zone to a fifth heat transfer zone configured to heat the liquid stream and provide a reheated liquid stream, and, passing the reheated liquid stream into the separation column in the first separation zone below the first heat transfer zone, wherein the liquid stream comprises solvent and aromatic hydrocarbons.

* * * * *